United States Patent
Jun et al.

(10) Patent No.: US 8,252,205 B2
(45) Date of Patent: Aug. 28, 2012

(54) METHOD FOR PREPARING METAL PHOSPHIDE NANOCRYSTAL FROM PHOSPHITE COMPOUND AND METHOD FOR PASSIVATING NANOCRYSTAL CORE WITH THE SAME

(75) Inventors: Shin Ae Jun, Seongnam-si (KR); Eun Joo Jang, Suwon-si (KR); Jung Eun Lim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 1151 days.

(21) Appl. No.: 11/970,972

(22) Filed: Jan. 8, 2008

(65) Prior Publication Data

US 2008/0258159 A1   Oct. 23, 2008

(30) Foreign Application Priority Data

Apr. 17, 2007  (KR) .................. 10-2007-0037385

(51) Int. Cl.
*H01B 1/02* (2006.01)
(52) U.S. Cl. ................ 252/519.14; 252/518.1; 438/604; 423/111; 977/773; 977/813; 977/818
(58) Field of Classification Search .................. 252/500, 252/519.34, 518.1, 519.14; 977/773, 813, 977/818; 423/111; 438/604
See application file for complete search history.

(56) References Cited

U.S. PATENT DOCUMENTS

| 7,557,028 | B1 * | 7/2009 | Scher et al. ................... 438/604 |
| 2005/0129947 | A1 | 6/2005 | Peng et al. |
| 2010/0289003 | A1 * | 11/2010 | Kahen et al. ................... 257/14 |
| 2011/0006269 | A1 * | 1/2011 | Petruska et al. ........... 252/518.1 |

FOREIGN PATENT DOCUMENTS

KR   10-2006-0071763   6/2006

OTHER PUBLICATIONS

European Extended Search Report; Application No. 08154444.7 dated Jul. 2, 2010.
Zerzouf, O. et al., Influence of the Choice of Indium Precursor and Ligand on the Synthesis of InP Nanocrystals, Z. Phys. Chem. 2007, vol. 221, No. 3; 393-402.
Notice of Preliminary Rejection issued by Korean Intellectual Property Office for the corresponding Korean Application 10-2007-0037385 and its English Translation, Dated Mar. 31, 2008.

* cited by examiner

*Primary Examiner* — Mark Kopec
*Assistant Examiner* — Haidung Nguyen
(74) *Attorney, Agent, or Firm* — Cantor Colburn LLP (57) ABSTRACT

Disclosed herein is a method for the preparation of metal phosphide nanocrystals using a phosphite compound as a phosphorous precursor. More specifically, disclosed herein is a method for preparing metal phosphide nanocrystals by reacting a metal precursor with a phosphite compound in a solvent. A method is also provided for passivating a metal phosphide layer on the surface of a nanocrystal core by reacting a metal precursor with a phosphite compound in a solvent. The metal phosphide nanocrystals have uniform particle sizes and various shapes.

8 Claims, 4 Drawing Sheets

METHOD FOR PREPARING METAL PHOSPHIDE NANOCRYSTAL FROM PHOSPHITE COMPOUND AND METHOD FOR PASSIVATING NANOCRYSTAL CORE WITH THE SAME

CROSS-REFERENCE TO RELATED APPLICATIONS

This non-provisional application claims priority under 35 U.S.C. §119(a) to Korean Patent Application No. 2007-37385 filed on Apr. 17, 2007, the entire contents of which are hereby incorporated by reference.

BACKGROUND OF THE INVENTION

1. Field of the Invention

The present invention is directed to a method for preparing metal phosphide nanocrystals from a phosphite compound, and a method for passivating a nanocrystal core with the same. More specifically, the present invention relates to a method for producing metal phosphide nanocrystals and a method for passivating a nanocrystal core, which can be conducted under more controlled conditions via the introduction of a phosphite compound as a phosphorous precursor.

2. Description of the Related Art

Nanocrystals exhibit electrical, magnetic, optical, chemical and mechanical properties that are distinguished from those of bulky substances. Since the properties of nanocrystals are readily controllable depending upon the size and composition of the nanocrystals, there has been extensive interest in nanocrystals. Based on their luminescent and electrical properties alone, nanocrystals can be utilized in a variety of applications including light-emitting and light-receiving devices, solar cells, sensors and lasers.

Vapor deposition processes, including metal organic chemical vapor deposition (MOCVD) and molecular beam epitaxy (MBE), have been used to prepare nanocrystals. In recent years, there have been a number of studies conducted to investigate the preparation of semiconductor nanocrystals using a wet chemistry method wherein a precursor material is added to a coordinating organic solvent in order to grow the nanocrystals to a desired size.

As the crystals are grown, the organic solvent is naturally coordinated to the surface of the nanocrystals, thereby acting as a dispersant to adjust the crystals to a nanometer-scale level. The wet chemistry method has advantages in that nanocrystals of a variety of sizes can be uniformly prepared by appropriately controlling the concentration of precursor materials used, the type of organic solvents used, as well as the preparation temperature and time. In particular, since Group II-VI compound semiconductor nanocrystals can emit light in the visible range and, since they can be prepared in a simple manner as compared to Group III-V compound semiconductor nanocrystals, they are actively under study.

Since Group III-V compound semiconductor nanocrystals have a covalent bond, they exhibit superior stability and relatively low toxicity as compared to Group II-VI compound semiconductor nanocrystals that have an ionic bond. However, Group III-V compound semiconductor nanocrystals have disadvantages associated with their synthesis such as, for example, a long synthesis time and a limited number of potential precursors.

In particular, synthesis methods for metal phosphide nanocrystals (e.g., indium phosphide (InP) or gallium phosphide (GaP)) are being actively studied. According to prior art wet chemistry methods, trimethylsilyl phosphine ("$(TMS)_3$ P") is the only phosphorus precursor used. However, $(TMS)_3$ P has a very high reactivity, thus making it difficult to control a reaction under predetermined conditions.

Accordingly, there is an increasing demand for a wet chemistry synthesis method that enables the preparation of metal phosphide nanocrystals under more controlled conditions.

SUMMARY OF THE INVENTION

In one embodiment, a method is provided for preparing metal phosphide nanocrystals by wet chemical synthesis, wherein the method comprises reacting a metal precursor with a phosphite compound in a solvent.

In another embodiment, the method for preparing the metal phosphide nanocrystals comprises adjusting a temperature of a metal precursor solution comprising a metal precursor, a dispersant, and a solvent to a predetermined temperature; preparing a phosphate compound solution; feeding the phosphate compound solution to the metal precursor solution and reacting the mixture, to grow metal phosphide nanocrystals; and separating the metal phosphide nanocrystals from the mixture.

In yet another embodiment, a method is provided for passivating a nanocrystal core wherein the method comprises adding a metal precursor and a phosphite compound to a solution comprising a nanocrystal core and reacting the mixture to passivate a metal phosphide layer on the surface of the nanocrystal core.

In one embodiment, the method for passivating a nanocrystal core comprises preparing a nanocrystal core solution comprising a nanocrystal core, a metal precursor, and a dispersant; preparing a phosphite compound solution comprising a phosphite compound in a solvent; feeding the phosphate compound solution to the nanocrystal core solution and reacting the mixture to prepare metal phosphide nanocrystals; and separating the metal phosphide nanocrystals from the mixture.

In another embodiment, metal phosphide nanocrystals are provided as prepared by the foregoing methods.

In accordance with one aspect, there is provided an inorganic-organic hybrid electroluminescence device comprising a plurality of organic and inorganic layers interposed between a pair of electrodes wherein the organic layer comprises a luminescent layer comprising the metal phosphide nanocrystals according to the present invention.

In accordance with another aspect, the method provides a nanocrystal wherein the shape of the metal phosphide nanocrystals can be readily controlled by introduction of a phosphite compound as a phosphorous precursor.

In accordance with another aspect, the method provides the use of a wide variety of for the formation of the nanocrystals of solvents, since the phosphite compound is highly soluble in numerous solvents.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

The present invention will now be described in more detail with reference to the accompanying drawings.

It will be understood that when an element or layer is referred to as being "on," "interposed," "disposed," or "between" another element or layer, it can be directly on, interposed, disposed, or between the other element or layer or intervening elements or layers may be present.

It will be understood that, although the terms first, second, third, and the like may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, first element, component, region, layer or section discussed below could be termed second element, component, region, layer or section without departing from the teachings of the present invention.

As used herein, the singular forms "a," "an" and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The method described herein utilizes a phosphite compound as a novel phosphorus precursor for the preparation of metal phosphide nanocrystals. Specifically, when a phosphite compound solution is mixed with a solution comprising at least one metal precursor, the phosphite compound, as the phosphorus precursor, reacts with the metal precursor in the mixed solution resulting in the formation of metal phosphide nanocrystals.

According to one embodiment, the metal phosphide nanocrystals have a uniform particle size at the nanometer-scale level, selectively desired crystal structures, and various shapes, as a result of the use of the phosphite compound as a phosphorus precursor metal.

As mentioned previously, trimethylsilyl phosphine ((TMS)$_3$P), has been generally used as a phosphorus precursor in wet chemistry methods. (TMS)$_3$P contains electron-donating ligands, making the central phosphorus atom highly nucleophilic. In addition, since (TMS)$_3$P contains P—Si bonds which are easily cleavable due to their weak bonding strength, (TMS)$_3$P is a highly reactive phosphorus compound capable of readily forming metal phosphide bonds upon reaction with a metal. For this reason, the reaction of (TMS)$_3$P with a metal precursor cannot be appropriately controlled at a high temperature. Conversely, the use of a phosphite compound as a phosphorus precursor, as disclosed herein, results in the formation of a stable P—O bond, and as such, the reaction can be carried out under controlled conditions. Specifically, in the case where nucleophilic (TMS)$_3$P is used as a phosphorus precursor, the reaction time can be controlled within about 5 seconds (sec) to about 10 minutes (min) while the reaction temperature is maintained at about 300° Celsius (C). On the other hand, in a case where a phosphite compound is used as a phosphorus precursor, the reaction time can be adjusted to about 20 sec to about 60 min while the reaction temperature is maintained at about 300° C.

Accordingly, the method described herein has an advantage in that the reaction conditions can be controlled over a wider-ranging period of time. In addition, because P—Si bonds are cleaved, even in the absence of the metal precursor, the reaction of (TMS)$_3$P with the metal precursor must be proceed under conditions wherein the amount of (TMS)$_3$P is smaller than that of the metal precursor, in order to minimize the formation of a phosphorous aggregate at a high temperature. However, the phosphite compound is stable, and can thus be utilized independent of the concentration of the metal precursor. Accordingly, the use of the phosphite compound as a phosphorous precursor enables the preparation of nanocrystals in a desired shape and size, under more varied conditions.

Since the phosphite compound remains on the surface of the grown nanocrystals, the surface properties of the nanocrystals can also be controlled depending on the type of functional groups that are included in the phosphite compound, without any additional surface displacement.

That is, it is estimated that the phosphite compound acts as a phosphorous precursor during the preparation of metal phosphide nanocrystals, and furthermore, any unreacted phosphite compound acts as a kind of dispersant surrounding the surface of the nanocrystals. Accordingly, the use of at least one phosphite compound having various types of functional groups, enables the preparation of metal phosphide nanocrystals whose surface properties (e.g. polarity and binding properties) are controlled without resulting in additional surface displacement.

The phosphite compound described herein is miscible with a variety of solvents, depending upon the functional groups that are included in the phosphite compound. Accordingly, the method described herein enables the selection of a suitable solvent from a variety of types of solvents. In particular, the method has a distinct advantage in that a nontoxic solvent can be used.

In addition, in the case where metal phosphide nanocrystals are grown on the surface of other kinds of nanocrystals, defects present on the surface can be protected, and thus the optical and electrical properties of the nanocrystals can be controlled.

In one embodiment, a method is provided for preparing a metal phosphide nanocrystal by chemical wet synthesis, wherein the method comprises reacting a metal precursor with a phosphite compound in a solvent.

Figure 1:
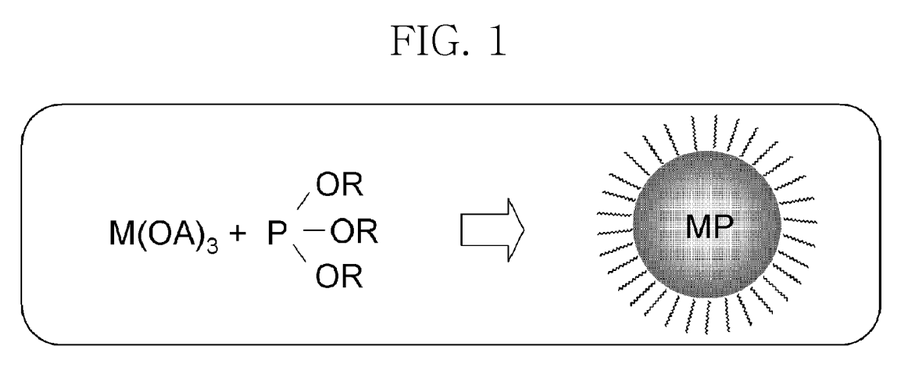
FIG. 1 is an exemplary schematic diagram illustrating a method for preparing metal phosphide nanocrystals.

The method for preparing a metal phosphide nanocrystal comprises: adjusting the temperature of a metal precursor solution comprising a metal precursor and a dispersant to a predetermined temperature; preparing a reaction solution of a phosphite compound; feeding the phosphite compound solution to the metal precursor solution and, reacting the mixture, to prepare metal phosphide nanocrystals; and separating the metal phosphide nanocrystals from the mixture. Accordingly, the method can be variously modified and altered by processes known in the art.

Examples of metal precursors include, organometallic compounds having an element selected from Zn, Cd, Hg, Pb, Sn, Ge, Ga, In, Tl, Sc, Ti, V, Cr, Mn, Fe, Co, Ni, Cu, Y, Zr, Nb, Mo, Tc, Pd, Ag, Pt, Au, or salts thereof, or a combination comprising at least one of the foregoing elements. Specifically, the use of organometallic compounds having a Group III metal element.

Examples of specific organometallic compounds having a Group III metal element include, gallium acetylacetonate, gallium chloride, gallium fluoride, gallium oxide, gallium nitrate, gallium sulfate, indium acetate, indium acetylacetonate, indium chloride, indium oxide, indium nitrate, indium sulfate, thallium acetate, thallium acetylacetonate, thallium chloride, thallium oxide, thallium ethoxide, thallium nitrate, thallium sulfate, thallium carbonate, or alloys, or a combination comprising at least one of the foregoing organometallic compounds.

The phosphite compound is represented by Formula 1 below:

$$P(OR)_3 \qquad [\text{Formula 1}]$$

In Formula 1, R is selected from a substituted or an unsubstituted $C_1$-$C_{20}$ alkyl, aryl, ether, ethylene, oxide and propylene oxide.

When R is a substituted alkyl, the alkyl of the phosphite compound comprises at least one functional group at an intermediate or terminal position. The functional group may be selected from unsaturated, carboxyl, amide, phenyl, amine, acryl, silane, phosphine, phosphinic acid, cyano and thiol groups. The phosphite compound may be used alone or as a combination comprising at least one of the foregoing functional groups.

The reaction solvent used herein may be selected from organic solvents generally used in the art. Examples of reaction solvents include primary alkyl amines, secondary alkyl amines, heterocyclic compounds containing at least one nitrogen or sulfur atom, alkanes, alkenes, alkynes, trioctylphosphine, and trioctylphosphine oxide. Other examples of reaction solvents include polar primary alcohols, secondary alcohols, tertiary alcohols, ketones esters. Furthermore, aqueous solutions, and combinations of both aqueous solutions and organic solvents, may be used as reaction solvents.

Examples of suitable dispersants that can be used in the method include carboxyl acids, for example, oleic acid, stearic acid and palmitic acid; organic phosphorus acids, for example, hexyl phosphonic acid, n-octyl phosphonic acid, tetradecyl phosphonic acid and octadecyl phosphonic acid; and amines, for example, n-octyl amine, hexadecyl amine. Since the phosphite compound acts as both a phosphorus precursor and as a dispersant, the method of the present invention can avoid the use of a dispersant.

The phosphite compound is preferably diluted to about 0.001 Molar (M) to about 1M in a solvent. Examples of solvents that can be used to dilute the phosphite compound include solvents having a low boiling point, such as dimethyl chloride, toluene, hexane, heptane, octane, pyridine and butanol, in addition to the reaction solvents.

The phosphite compound is stable, thus advantageously allowing the uniform preparation of a nanocrystal at a high temperature. The reaction temperature is about 80° C. to about 400° C., specifically about 150° C. to about 350° C., and more specifically about 200° C. to about 350° C. The reaction time may vary depending on the type of metal used and the phosphite compound, and is preferably about one second to about one day.

In another embodiment, a method is provided for passivating a nanocrystal core with a metal phosphide layer, wherein the method comprises adding a metal precursor and a phosphite compound to a solution comprising a nanocrystal core, and reacting the mixture.

According to one embodiment, the passivation of the nanocrystal core can be carried out with the same constituent components as in the nanocrystal preparation. The passivation method may comprise preparing a nanocrystal core solution comprising a nanocrystal core, a metal precursor, and a dispersant; preparing a phosphite compound solution comprising a phosphite compound; adding the phosphite compound solution prepared to the nanocrystal core solution and reacting the mixture to prepare metal phosphide nanocrystals; and, separating the metal phosphide nanocrystal from the mixture. Accordingly, the method of the present invention can be variously modified and altered by processes known in the art.

Since the phosphite compound is highly reactive with the surface of the core nanocrystals, the addition of the phosphite compound to the nanocrystal core solution permits the phosphite compound to selectively surround the surface of the nanocrystal core. If a metal precursor is included in the solution, the metal precursor starts to react with the phosphite compound to grow metal phosphide nanocrystals on the core surface. The grown metal phosphide layer removes any defects present on the surface of the nanocrystals, and changes the surface characteristics of the nanocrystals.

Nanocrystals used as the core herein are not limited to compound semiconductor materials alone, and include metal oxide nanocrystals and metal nanocrystals on which a phosphite compound can be adsorbed. Examples of specific core nanocrystals include semiconductor compound nanocrystals selected from CdS, CdSe, CdTe, ZnS, ZnSe, ZnTe, HgS, HgSe, HgTe, GaN, GaP, GaAs, InP or InAs; metal oxide nanocrystals selected from $TiO_2$, $SiO_2$, CdO, $Fe_2O_3$, CuO, AgO or ZrO; and metal nanocrystals selected from Pt, Pd, Ru, Rh, Ir, Au, Ag, Fe, Co, Ni, Si or Ge; or, combinations comprising at least one of the foregoing semiconductor, metal oxide or metal nanocrystals.

The nanocrystal core may have may have various shapes selected from spheres, rods, tripods, tetrapods, cubes, boxes, stars, or a combinations comprising at least one of the foregoing shapes.

According to another embodiment, the present invention is directed to metal phosphide nanocrystals prepared by the method.

The metal phosphide nanocrystal, or the metal phosphide layer formed on the nanocrystal core, comprise a metal phosphide selected from AlP, InP, GaP, $Zn_3P_2$, $Cd_3P_2$, MnP, FeP, $Fe_2P$, $CO_2P$ or $Ni_2P$, or a combination comprising at least one of the foregoing metal phosphides. If two or more metal phosphides are present as nanocrystals, they may be partially localized or may be present in a mixture or an alloy form.

The metal phosphide nanocrystals may have various shapes selected from spheres, rods, tripods, tetrapods, cubes, boxes, stars, or a combination comprising at least one of the foregoing shapes.

The metal phosphide nanocrystal, and the nanocrystal passivated by the metal phosphide layer, can be utilized in a variety of applications including, for example, displays, sensors, and electronic devices. In particular, these nanocrystals are useful for the production of a light-emitting layer for an organic/inorganic hybrid electroluminescent device. The introduction of the semiconductor nanocrystals into the light-emitting layer, can be carried out using common processes known in the art, including vapor deposition, sputtering, printing, coating and electron beam processes. The light-emitting layer preferably has a thickness of about 50 to about 100 nanometers (nm). In addition to the light-emitting layer, organic layers present in an inorganic-organic hybrid electroluminescence device, include an electron transport layer and a hole transport layer, both of which are interposed between a pair of electrodes and are composed of organic compounds.

The electroluminescent device described above may comprise layers disposed in a variety of structures known in the art. Examples of structures include, anode/light-emitting layer/cathode, anode/buffer layer/light-emitting layer/cathode, anode/hole transport layer/light-emitting layer/cathode, anode/buffer layer/hole transport layer/light-emitting layer/cathode, anode/buffer layer/hole transport layer/light-emitting layer/electron transport layer/cathode, or anode/buffer layer/hole transport layer/light-emitting layer/hole blocking layer/cathode, or a combination comprising at least one of the foregoing layer structures.

Materials for the buffer layer comprise compounds commonly known in the art. Examples of buffer layer materials include, copper phthalocyanine, polythiophene, polyaniline, polyacetylene, polypyrrole, polyphenylene vinylene or derivatives thereof, or a combination comprising at least one of the foregoing buffer layer materials.

Materials for the hole transport layer comprise compounds commonly known in the art. Specifically, polytriphenylamine can be used, but the present invention is not limited thereto.

Materials for the electron transport layer comprise compounds commonly known in the art. Specifically, polyoxadiazole can be used, but the present invention is not limited thereto.

Materials for the hole blocking layer comprise compounds commonly known in the art. Examples of materials for the hole blocking layer include LiF, $BaF_2$, $MgF_2$, and the like.

The organic/inorganic hybrid electroluminescent device described herein does not require particular fabrication apparatuses and methods, and can be fabricated in accordance with prior art methods for organic electroluminescence devices, using common materials.

Hereinafter, the present invention will be explained in more detail with reference to the following examples. However, these examples are given for the purpose of illustration and are not to be construed as limiting the scope of the invention.

EXAMPLES

Example 1

Synthesis of InP Nanocrystals from a Triethylphosphite Compound at about 300° C.

Ten grams (g) of octadecene ("ODE"), 0.2 g of oleic acid, and 0.2 mmol of indium acetate were put in a 125 ml flask equipped with a reflux condenser. The mixture was reacted with stirring until the reaction temperature reached about 300° C.

Separately, about 70 microliters (μL) of triethylphosphite was dissolved in 1 mL of ODE to prepare a solution. The solution was rapidly added to the reaction mixture. The mixture was reacted with stirring for about one hour.

Figure 2:
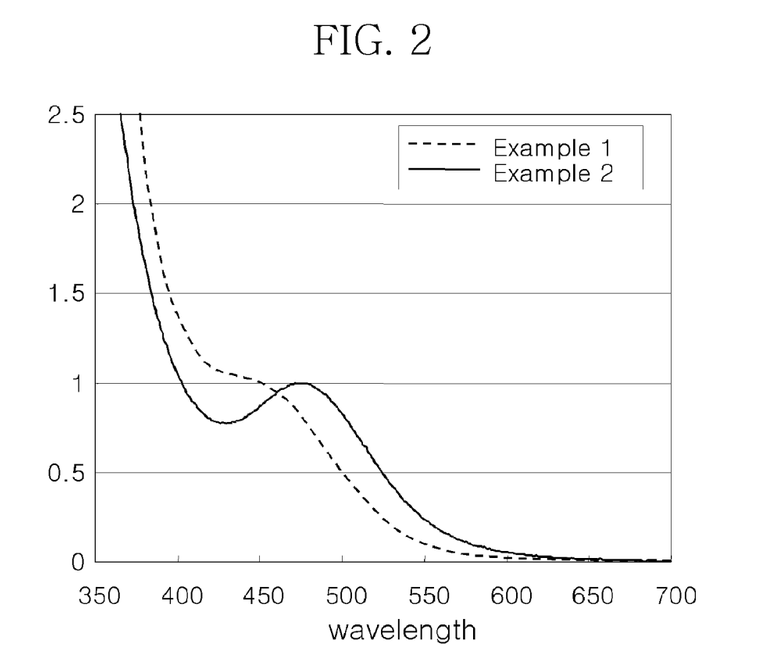
FIG. 2 is a UV absorption spectrum of the metal phosphide nanocrystals synthesized in Examples 1 and 2.
Figure 3A:
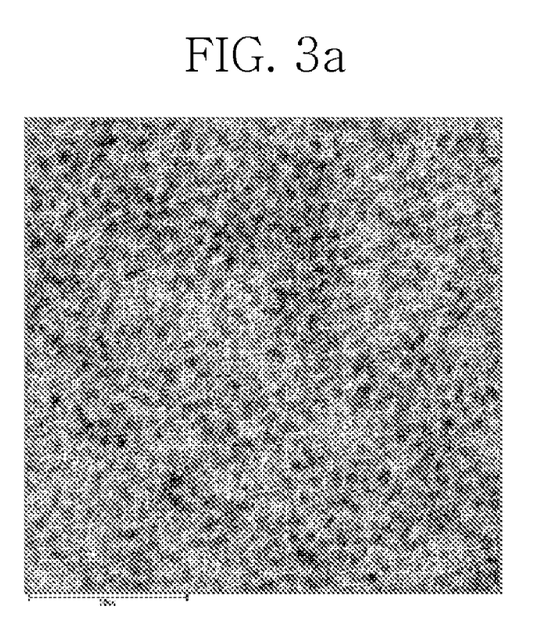
FIGS. 3A and 3B are transmission electron micrographs (TEM) of metal phosphide nanocrystals synthesized as described in Examples 1 and 2 respectively.

After the completion of the reaction, the reaction temperature was cooled to room temperature as quickly as possible. Ethanol as a non-solvent was added to the cooled reaction mixture, and the resulting mixture was centrifuged. The suspension was decanted away to obtain a precipitate. The precipitate was dispersed in 5 mL of toluene to yield a solution of InP nanocrystals. FIG. 2 shows the UV absorption spectrum for the InP nanocrystals. As shown in FIG. 2, a clearly dissolved peak demonstrates that the InP nanocrystals were produced with a constant size and shape. FIG. 3A is a transmission electron micrograph (TEM) of the InP nanocrystals.

Example 2

Synthesis of InP Nanocrystals from a Triethylphosphite Compound at about 320° C.

Ten g of ODE, 0.2 g of oleic acid and 0.2 mmol of indium acetate were put in a 125 ml flask equipped with a reflux condenser. The mixture was reacted with stirring until the reaction temperature reached about 320° C.

Separately, about 70 μL of triethylphosphite was dissolved in 1 mL of ODE to prepare a solution. The solution was rapidly added to the reaction mixture. The mixture was reacted with stirring for about one hour.

Figure 3B:
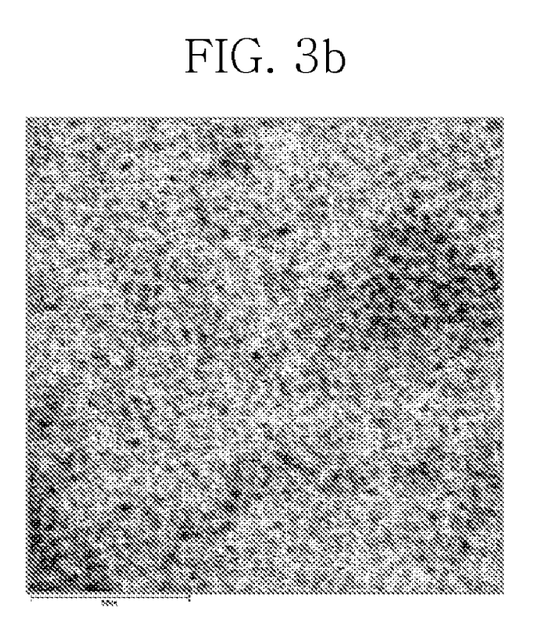

After completion of the reaction, the reaction temperature was cooled to room temperature as quickly as possible. Ethanol as a non-solvent was added to the cooled reaction mixture, and the resulting mixture was then centrifuged. The suspension was decanted away to obtain a precipitate. The precipitate was dispersed in 5 mL of toluene to yield a solution of InP nanocrystals. FIG. 2 shows the UV absorption spectrum for the InP nanocrystals. As shown in shown in FIG. 2, a clearly dissolved peak demonstrates that the InP nanocrystals have superior crystallinity as compared to the sample produced in Example 1. FIG. 3B is a transmission electron micrograph (TEM) of the InP nanocrystals.

Example 3

Synthesis of CdSe/CdS Nanocrystal and Formation of InP Passivation Layer

Sixteen g of trioctyl amine ("TOA"), 2.0 g of oleic acid, and 1.6 mmol of cadmium oxide were put in a 125 ml flask equipped with a reflux condenser. The mixture was reacted with stirring until the reaction temperature was adjusted to about 300° C.

Separately, a selenium (Se) powder was dissolved in trioctyl phosphine ("TOP") to prepare a Se-TOP complex solution (Se concentration: ca. 0.1 M). The Se-TOP complex solution was rapidly added to the stirring reaction mixture and further reacted for about 2 min. To the reaction mixture a solution of octane thiol (0.06 g) in TOA (2 mL) was slowly added. The reaction mixture was allowed to stand at the same temperature (about 300° C.) for about 30 minutes.

After completion of the reaction, the reaction temperature was cooled to room temperature as quickly as possible. Ethanol as a non-solvent was added to the cooled reaction mixture, and the resulting mixture was then centrifuged. The suspension was decanted away to obtain a precipitate. The precipitate was dispersed in 5 mL of toluene to prepare a solution of CdSe/CdS nanocrystals.

Ten g of ODE, 0.04 g of oleic acid and 0.04 mmol of indium acetate were put in a 125 ml flask equipped with a reflux condenser. The mixture was reacted with stirring until the reaction temperature was adjusted to about 300° C.

To the reaction mixture the CdSe/CdS nanocrystal solution, and a solution of triethyl phosphite (about 70 μL) in ODE (1 mL), were sequentially added. The mixture was reacted for about one hour.

Figure 4A:
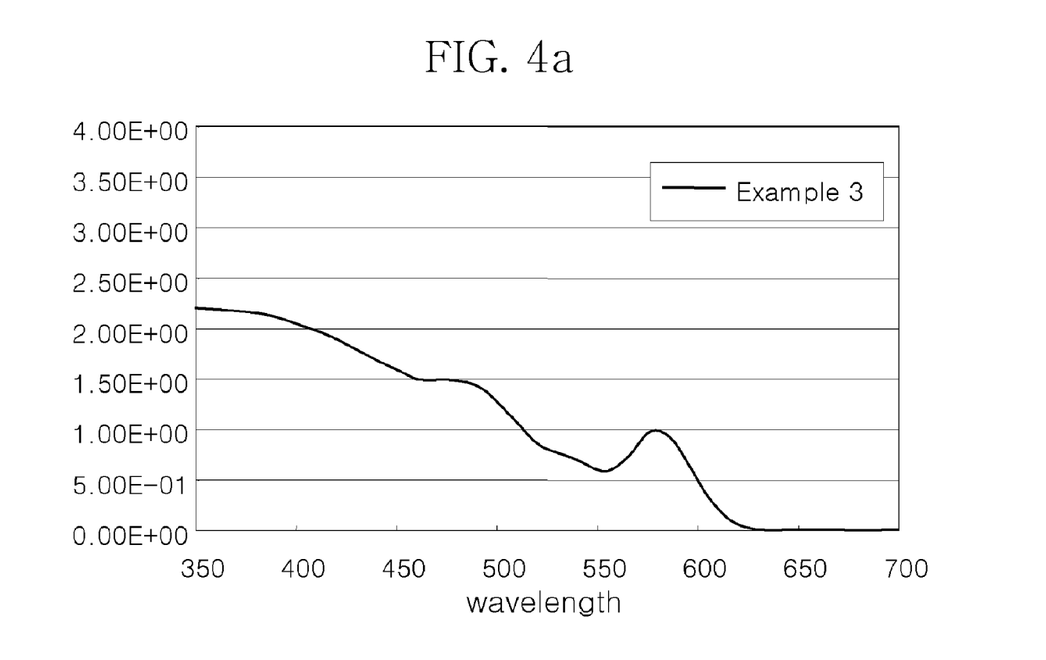
FIG. 4A is a UV absorption spectrum for the nanocrystals obtained before and after the formation of a metal phosphide passivation layer synthesized as described in Example 3.
Figure 4B:
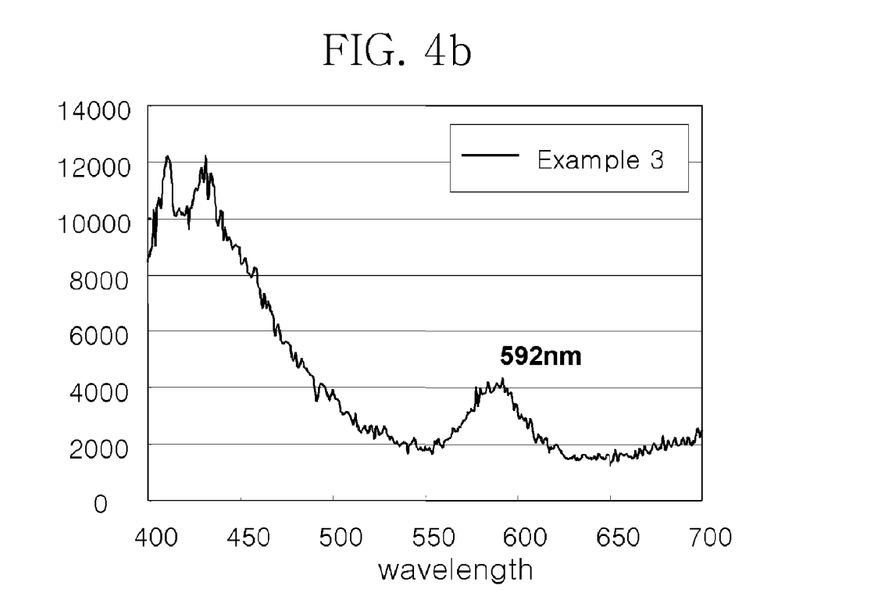
FIG. 4B is a photoluminescence spectrum for the nanocrystals after the formation of a metal phosphide passivation layer synthesized as described in Example 3.
Figure 5:
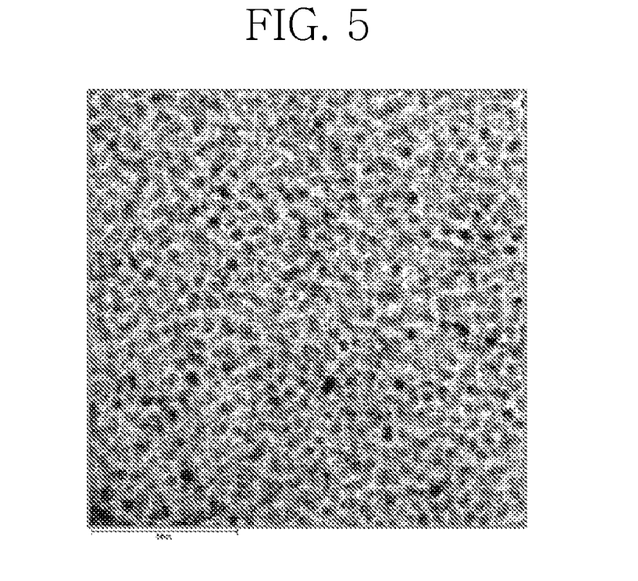
FIG. 5 is a transmission electron micrograph (TEM) of the nanocrystals after the formation a metal phosphide passivation layer as described in Example 3.

After completion of the reaction, the reaction temperature was cooled to room temperature as quickly as possible. Ethanol as a non-solvent was added to the cooled reaction mixture, and the resulting mixture was then centrifuged. The suspension was decanted away to obtain a precipitate. The precipitate was dispersed in 5 mL of toluene. FIG. 4A shows the UV absorption spectrum for the CdSe/CdS nanocrystals before and after the formation of an InP passivation layer. It can be seen in FIG. 4A that the UV absorption spectrum of the CdSe/CdS nanocrystal core was maintained following the formation of the InP passivation layer. FIG. 4B shows the photoluminescence spectrum of the nanocrystals following the formation of the InP passivation layer. A luminescence peak was observed at about 592 nm. FIG. 5 is a transmission electron micrograph (TEM) of the CdSe/CdS/InP nanocrystals in which the InP passivation layer is formed on the CdSe/CdS nanocrystals.

Comparative Example 1

Synthesis of InP Nanocrystal from Trioctylphosphine Compound

Ten g of ODE, 0.2 g of oleic acid and 0.2 mmol of indium acetate were put in a 125 ml flask equipped with a reflux condenser. The mixture was reacted with stirring until the reaction temperature was adjusted to about 320° C.

About 0.2 g of trioctylphosphine was dissolved in 1 mL of ODE to prepare a solution. The solution was rapidly added to the reaction mixture. The mixture was reacted with stirring for about 20 min.

Figure 6:
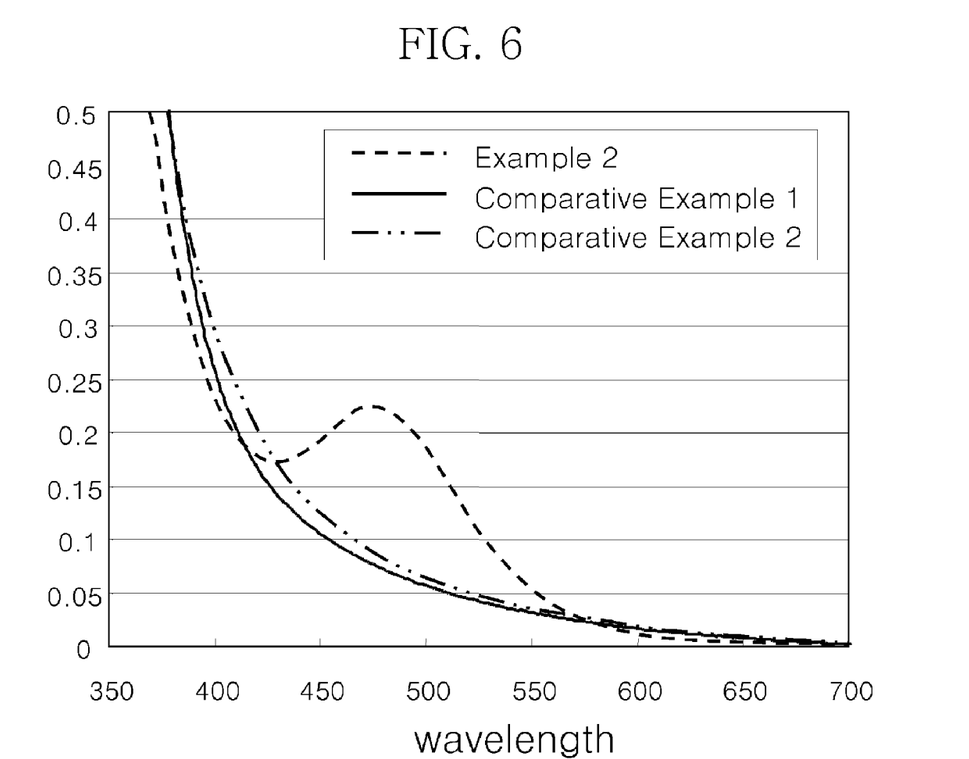
FIG. 6 is a UV absorption spectrum of the metal phosphide nanocrystals synthesized as described in Example 2, and in Comparative Examples 1 and 2.

After completion of the reaction, the reaction temperature was cooled to room temperature as quickly as possible. Ethanol as a non-solvent was added to the cooled reaction mixture, and the resulting mixture was then centrifuged. The suspension was decanted away to obtain a precipitate. The precipitate was dispersed in 5 mL of toluene. The dispersion was analyzed by UV absorption spectroscopy, and the results are shown in FIG. 6. The fact that there is no peak corresponding to InP demonstrates that the InP nanocrystals were not formed.

Comparative Example 2

Synthesis of InP Nanocrystal from Tributylphosphine Compound

Ten g of ODE, 0.2 g of oleic acid and 0.2 mmol of indium acetate were put in a 125 ml flask equipped with a reflux condenser. The mixture was reacted with stirring until the reaction temperature was adjusted to about 320° C.

About 0.1 g of trioctylphosphine was dissolved in 1 mL of ODE to prepare a solution. The solution was rapidly added to the reaction mixture. The mixture was reacted with stirring for about 20 min.

After completion of the reaction, the reaction temperature was cooled to room temperature as quickly as possible. Ethanol as a non-solvent was added to the cooled reaction mixture, and the resulting mixture was then centrifuged. The suspension was decanted away to obtain a precipitate. The precipitate was dispersed in 5 mL of toluene. The dispersion was analyzed by UV absorption spectroscopy and the results are shown in FIG. 6. The fact that there is no peak corresponding to InP was not observed indicates the InP nanocrystals were not formed. Further, this result was confirmed in that, when phosphine-based compounds having a highly stable P—C bond were used, no InP was formed.

As is apparent from the foregoing examples, the exemplary metal phosphide nanocrystals can be prepared under more controlled conditions via the use of a phosphite compound as a phosphorous precursor. As a result, the metal phosphide nanocrystals thus prepared have selectively desired crystal structures and a variety of shapes. Furthermore, the surface properties of the metal phosphide nanocrystals can be controlled depending upon the functional groups that are included in the phosphite compound. In addition, the phosphite compound is miscible in a variety of solvents, thus allowing for its use under various reaction conditions.

Through the formation of a metal phosphide layer made of a phosphide compound on the surface of the nanocrystals, the optical and electrical properties of the nanocrystals can be controlled and thus, significantly improved luminescence efficiency can be realized.

Reference throughout the specification to "one embodiment", "another embodiment", "an embodiment", and so forth, means that a particular element (e.g. feature, structure, and/or characteristic) described in connection with the embodiment is included in at least one embodiment described herein, and may or may not be present in other embodiments. In addition, it is to be understood that the described elements may be combined in any suitable manner in the various embodiments.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for preparing metal phosphide nanocrystals by wet chemical synthesis, wherein the method comprises:
adjusting a temperature of a metal precursor solution to a predetermined temperature, the metal precursor solution comprising a metal precursor, a dispersant and a solvent;
preparing a phosphite compound solution;
wherein the phosphite compound is represented by Formula 1 below:

$$P(OR)_3 \quad \text{(Formula 1)}$$

wherein R is selected from the group consisting of a substituted or an unsubstituted $C_1$-$C_{20}$ alkyl, aryl, ether, ethylene oxide, and propylene oxide;
feeding the phosphite compound solution to the metal precursor solution to form a mixture;
reacting the mixture to grow metal phosphide nanocrystals; and
separating the metal phosphide nanocrystals from the mixture.

2. The method of claim 1, wherein the metal precursor is an organometallic compound having an element selected from the group consisting of Zn, Cd, Hg, Pb, Sn, Ge, Ga, In, Tl, Sc, Ti, V, Cr, Mn, Fe, Co, Ni, Cu, Y, Zr, Nb, Mo, Tc, Pd, Ag, Pt, and Au, a salt of Zn, Cd, Hg, Pb, Sn, Ge, Ga, In, Tl, Sc, Ti, V, Cr, Mn, Fe, Co, Ni, Cu, Y, Zr, Nb, Mo, Tc, Pd, Ag, Pt, and Au, and a combination comprising at least one of the foregoing elements or salts.

3. The method of claim 1, wherein the metal precursor is selected from the group consisting of gallium acetylacetonate, gallium chloride, gallium fluoride, gallium oxide, gallium nitrate, gallium sulfate, indium acetate, indium acetylacetonate, indium chloride, indium oxide, indium nitrate, indium sulfate, thallium acetate, thallium acetylacetonate, thallium chloride, thallium oxide, thallium ethoxide, thallium nitrate, thallium sulfate, thallium carbonate, alloys thereof, and combinations comprising at least one of the foregoing compounds.

4. The method of claim 1, wherein R of Formula 1 is a substituted alkyl with a functional group selected from the group consisting of unsaturated, carboxyl, amide, phenyl, amine, acryl, silane, phosphine, phosphinic acid, cyano, and thiol group.

5. The method of claim 1, wherein the metal phosphide nanocrystals comprise a metal phosphide compound selected from the group consisting of AlP, InP, GaP, $Zn_3P_2$, $Cd_3P_2$, MnP, FeP, $Fe_2P$, $Co_2P$ $Ni_2P$, and a combination comprising at least one of the foregoing metal phosphide compounds.

6. The method of claim 1, wherein the metal phosphide nanocrystals have a shape selected from the group consisting of a sphere, rod, tripod, tetrapod, cube, box, star, and a combination comprising at least one of the foregoing shapes.

7. The method of claim 1, wherein the solvent is selected from the group consisting of primary alkyl amines, secondary alkyl amines, heterocyclic compounds containing at least one nitrogen or sulfur atom, alkanes, alkenes, alkynes, trioctylphosphine, trioctylphosphine oxide, polar primary alcohols, secondary alcohols, tertiary alcohols, ketones and esters, aqueous solutions, and a combination comprising at least one of the foregoing solvents.

8. The method of claim 1, wherein the reacting is conducted at a temperature of about 200° C. to about 350° C.

* * * * *